(12) United States Patent
Yang et al.

(10) Patent No.: US 11,383,450 B2
(45) Date of Patent: Jul. 12, 2022

(54) ADDITIVE MANUFACTURING SYSTEM AND METHOD AND FEATURE EXTRACTION METHOD

(71) Applicant: NATIONAL CHENG KUNG UNIVERSITY, Tainan (TW)

(72) Inventors: Haw-Ching Yang, Tainan (TW); Yu-Lung Lo, Tainan (TW); Hung-Chang Hsiao, Tainan (TW); Shyh-Hau Wang, Tainan (TW); Min-Chun Hu, Tainan (TW); Chih-Hung Huang, Tainan (TW); Fan-Tien Cheng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 260 days.

(21) Appl. No.: 16/854,927

(22) Filed: Apr. 22, 2020

(65) Prior Publication Data
US 2020/0247064 A1   Aug. 6, 2020

Related U.S. Application Data

(63) Continuation-in-part of application No. 16/591,613, filed on Oct. 2, 2019.
(Continued)

(51) Int. Cl.
*B29C 64/393* (2017.01)
*B29C 64/255* (2017.01)
(Continued)

(52) U.S. Cl.
CPC .......... *B29C 64/393* (2017.08); *B29C 64/153* (2017.08); *B29C 64/176* (2017.08);
(Continued)

(58) Field of Classification Search
CPC .... B29C 64/153; B29C 64/386; B29C 64/393
See application file for complete search history.

(56) References Cited

U.S. PATENT DOCUMENTS

| | | | |
|---|---|---|---|
| 8,095,484 B2 | 1/2012 | Cheng et al. | |
| 2016/0236279 A1* | 8/2016 | Ashton | G01N 21/274 |
| 2019/0128738 A1 | 5/2019 | Lo et al. | |

FOREIGN PATENT DOCUMENTS

| | | |
|---|---|---|
| CN | 106163774 A | 11/2016 |
| CN | 107708895 A | 2/2018 |

OTHER PUBLICATIONS

H.-C Yang, M. Adnan, C.-H Huang, F.-T Cheng, Y.-L Lo and C.-H Hsu, "An Intelligent Metrology Architecture With AVM for Metal Additive Manufacturing", IEEE Robotics and Automation Letters, vol. 4, No. 3, pp. 2886-2893, Jul. 2019.
(Continued)

*Primary Examiner* — James Sanders
(74) *Attorney, Agent, or Firm* — CKC & Partners Co., LLC

(57) ABSTRACT

An additive manufacturing (AM) system, an AM method, and an AM feature extraction method are provided. The AM system includes an AM tool, a product metrology system, an in-situ metrology system, a virtual metrology (VM) system, a compensator, a track planner, a controller, a simulator and an augmented reality (AR) device. The simulator is used to find feasible parameter ranges, while the AR device is used to support operations and maintenance of the AM tool. The product metrology system, the in-situ metrology system and the VM system are integrated to estimate the variation of material on a powder bed of the AM tool. The compensator is used for compensating the process variation by adjusting process parameters. The product metrology system is used to measure the quality of products. The in-situ metrology
(Continued)

system is used to collect features of melt pools on the powder bed.

3 Claims, 11 Drawing Sheets

Related U.S. Application Data

(60) Provisional application No. 62/740,435, filed on Oct. 3, 2018, provisional application No. 62/808,865, filed on Feb. 22, 2019, provisional application No. 62/837,211, filed on Apr. 23, 2019.

(51) Int. Cl.
| | |
|---|---|
| *B29C 64/176* | (2017.01) |
| *B29C 64/153* | (2017.01) |
| *B29C 64/245* | (2017.01) |
| *B29C 64/268* | (2017.01) |
| *B33Y 50/02* | (2015.01) |
| *B33Y 10/00* | (2015.01) |
| *B33Y 30/00* | (2015.01) |

(52) U.S. Cl.
CPC .......... *B29C 64/245* (2017.08); *B29C 64/255* (2017.08); *B29C 64/268* (2017.08); *B33Y 10/00* (2014.12); *B33Y 30/00* (2014.12); *B33Y 50/02* (2014.12)

(56) References Cited

OTHER PUBLICATIONS

F.-T. Cheng, H.-C. Huang and C.-A. Kao, "Developing an Automatic Virtual Metrology System", IEEE Transactions on Automation Science and Engineering, vol. 9, No. 1, pp. 181-188, Jan. 2012.
M.-H Hung, C.-F Chen, H.-C Huang, H.-C Yang and F.-T Cheng, "Development of an AVM System Implementation Framework", IEEE Transactions on Semiconductor Manufacturing, vol. 25, No. 4, pp. 598-613, Nov. 2012.
C.-C Chen, M.-H Hung, Benny Suryajaya, Y.-C Lin, H.-C Yang, H.-C Huang and F.-T Cheng "A Novel Efficient Big Data Processing Scheme for Feature Extraction in Electrical Discharge Machining", IEEE Robotics and Automation Letters, vol. 4, No. 2, pp. 910-917, Apr. 2019.
M.-H. Hung, T.-H. Lin, F.-T. Cheng and R.-C. Lin, "A Novel Virtual Metrology Scheme for Predicting CVD Thickness in Semiconductor Manufacturing", IEEE/ASME Transactions on mechatronics, vol. 12, No. 3, pp. 308-316, Jun. 2007.
F.-T. Cheng, C.-A. Kao, C.-F. Chen and W.-H. Tsai, "Tutorial on Applying the VM Technology for TFT-LCD Manufacturing", IEEE Transactions on Semiconductor Manufacturing, vol. 28, No. 1, pp. 55-69, Feb. 2015.
H. Tieng, T.-H Tsai, C.-F Chen, H.-C Yang, J.-W Huang and F.-T Cheng, "Automatic Virtual Metrology and Deformation Fusion Scheme for Engine-Case Manufacturing", IEEE Robotics and Automation Letters, vol. 3, No. 2, pp. 934-941, Apr. 2018.
H. Tieng, C.-F. Chen, F.-T. Cheng and H.-C. Yang, "Automatic Virtual Metrology and Target Value Adjustment for Mass Customization", IEEE Robotics and Automation Letters, vol. 2, No. 2, pp. 546-553, Apr. 2017.
C.-A Kao, F.-T Cheng, W.-M Wu, F.-W Kong and H.-H Huang, "Run-to-Run Control Utilizing Virtual Metrology With Reliance Index," IEEE Transactions on Semiconductor Manufacturing, vol. 26, No. 1, pp. 69-81, Feb. 2013.
H.-C. Tran and Y.-L. Lo, "Heat Transfer Simulations of Selective Laser Melting Process Based on Volumetric Heat Source with Powder Size Consideration", Journal of Materials Processing Technology, vol. 255, pp. 411-425, available online Dec. 19, 2017.

\* cited by examiner

US 11,383,450 B2

ADDITIVE MANUFACTURING SYSTEM AND METHOD AND FEATURE EXTRACTION METHOD

RELATED APPLICATIONS

This application is a continuation-in-part application of U.S. application Ser. No. 16/591,613, filed on Oct. 2, 2019, which claims the benefit of the Provisional Application Ser. No. 62/740,435 filed on Oct. 3, 2018; and the Provisional Application Ser. No. 62/808,865 filed on Feb. 22, 2019. This application also claims the benefit of the Provisional Application Ser. No. 62/837,211 filed on Apr. 23, 2019. The entire disclosures of all the above applications are hereby incorporated by reference herein.

BACKGROUND

Field of Invention

The disclosure relates to an additive manufacturing (AM) system, an AM method and an AM feature extraction method, and more particularly, to an AM system, an AM method and an AM feature extraction method that support virtual metrology (VM).

Description of Related Art

Additive manufacturing (AM), also referred to as 3D-printing, is a technique of heating metal powders or plastic material to be melt-shapeable after a digital computing model file is built, and then fabricating a workpiece by stacking layers. A powder bed fusion process is one of popular additive manufacturing techniques. The powder bed fusion process may be such as a selective laser melting (SLM) process, or a selective laser sintering (SLS) process. The selective laser melting process is performed by placing powders on a substrate, and using a high energy laser to irradiate a position at which a powder molding is desired to be formed, thereby melting and fusing the powders. The selective laser sintering process is also performed by using a laser to irradiate powders to sinter and fuse the powders into blocks, and then placing another layer of powders thereon to repeat the laser process until the product is formed.

A conventional AM tool lacks an online (on production line) tuning mechanism. While fixed values of process parameters (such as laser power, scan strategy, layer thickness, and scan speed, etc.) are used by the conventional AM tool for production, the production quality of the AM tool would vary with process variations (such as power distribution, flow control, and moisture content). A conventional AM technique performs quality measurements only after the products are completed for ensuring production quality. However, additive manufactured products are made by processing powders layer by layer, and thus poor processing quality of one certain layer often affect the quality of end product. Therefore, there is a need to provide an AM system, an AM method and an AM feature extraction method for obtaining product quality in time to adjust values of process parameters of an AM tool on a production line.

SUMMARY

An object of the disclosure is to provide an AM system, an AM method and an AM feature extraction method, thereby obtaining product quality in time such that values of process parameters of a AM tool can be adjusted on a production line.

According to the aforementioned object, an aspect of the disclosure is to provide an additive manufacturing (AM) system. The AM system includes an AM tool, a product metrology system, an in-situ metrology system and a virtual metrology system. The AM tool is configured to fabricate workpiece products, in which the AM tool includes a power bed and a fusion system. The power bed includes a powder bed container in which powder layers powder layers that are stacked on each other are held. The fusion system is configured to direct an energy beam to powder bodies on each of the powder layers respectively after the each of the powder layers is placed on the powder bed during a process of fabricating each of the workpiece products, thereby melting the powder bodies to form melt pools. The product metrology system is configured to measure qualities of the workpiece products respectively after the workpiece products are completely fabricated, thereby obtaining actual metrology values. The in-situ metrology system includes a pyrometer, a coaxial camera, an overview camera and an in-situ metrology server. The pyrometer is configured to perform a temperature measurement on each of the melt pools on the powder bed during a fabrication of each of the workpiece products, thereby obtaining a temperature of each of the melt pools of each of the workpiece products. The camera is configured to perform photography on each of the melt pools on the powder bed during the fabrication of each of the workpiece products, thereby obtaining an image of each of the melt pools of each of the workpiece products. The overview camera is configured to perform photography on each of the powder layers after the each of the powder layers is placed on the powder bed and before the energy beam is applied to the each of the powder layers, thereby obtaining plural workspace images of the powder layers of each workpiece product during the fabrication of the each workpiece product. The in-situ metrology server includes a workspace image processing device, an image-feature extraction device and a melt-pool feature processing device. The image-feature extraction device is configured to extract a length and a width of each of the melt pools from the image of each of the melt pools, and to correspond the length and the width to the temperature. The melt-pool feature processing device is configured to convert the length, the width and the temperature of each of the melt pools to a melt-pool length feature, a melt-pool width feature and a melt-pool temperature feature of each of the workpiece products. The workspace image processing device is configured to first convert each of the workspace images to a gray level co-occurrence matrix (GLCM); and then calculate a homogeneity index of each powder layer of each workpiece product from the GLCM. The virtual metrology system is configured to use plural sets of process data and the actual metrology values of the workpiece products to predict a virtual metrology value of a next workpiece product processed by the AM tool in accordance with a prediction algorithm after the workpiece products have been fabricated by the AM tool, in which the sets of process data includes the homogeneity index of each powder layer of each of the workpiece products, the melt-pool length feature, the melt-pool width feature and the melt-pool temperature feature of each of the workpiece products.

In some embodiments, the AM system includes a simulator, a compensator, a track planner and a controller. The simulator is configured to perform a simulation operation based on the sets of process data and/or the actual metrology values of the workpiece products, thereby generating a set of suggested parameter ranges. The compensator is configured to generate a set of process-parameter adjusted values based on the virtual metrology value. The track planner is configured to generate a set of process-parameter tracking values based on the set of process-parameter adjusted values, the set of suggested parameter ranges and a set of parameter design values. The controller is configured to control and adjust the AM tool to process the next workpiece product in accordance with the set of process-parameter tracking values.

According to the aforementioned object, another aspect of the disclosure is to provide an AM feature extraction method. In the AM feature extraction method, a temperature measurement is performed on each of melt pools formed on each of powder layers stacked on a powder bed during a fabrication of a workpiece product, thereby obtaining a temperature of each of the melt pools of the workpiece product; photograph is performed on each of the melt pools on the powder bed during the fabrication of the workpiece product, thereby obtaining images of the melt pools of the workpiece product; and photography is performed on each of the powder layers after the each of the powder layers is placed on the powder bed and before the energy beam is applied to the each of the powder layers, thereby obtaining plural workspace images of the powder layers of each workpiece product during the fabrication of the each workpiece product. Then, each of the workspace images is first converted to a gray level co-occurrence matrix (GLCM); and then a homogeneity index of each powder layer of each workpiece product is calculated based on the GLCM. Meanwhile, a length and a width of each of the melt pools are extracted from the images. Thereafter, a melt-pool feature processing operation is performed to convert the length, the width and the temperature of each of the melt pools to a melt-pool length feature, a melt-pool width feature and a melt-pool temperature feature of the workpiece product.

In some embodiments, the aforementioned melt-pool length feature, melt-pool width feature and melt-pool temperature feature include a maximum value, a minimum value, a mean value, a variance, a standard deviation, a skewness of statistic distribution, a kurtosis of statistic distribution, a full distance and/or a set of quantile of lengths of the melt pools in each of the at least one predetermined area; a maximum value, a minimum value, a mean value, a variance, a standard deviation, a skewness of statistic distribution, a kurtosis of statistic distribution, a full distance and/or a set of quantile of widths of the melt pools in each of the at least one predetermined area; and a maximum value, a minimum value, a mean value, a variance, a standard deviation, a skewness of statistic distribution, a kurtosis of statistic distribution, a full distance and/or a set of quantiles of temperatures of the melt pools in each of the at least one predetermined area.

In some embodiments, the aforementioned AM feature extraction method further includes extracting a central location of each of the melt pools from the image of each of the melt pools; and performing the melt-pool feature processing operation to convert the central location of each of the melt pools to a central-location feature of the workpiece product.

According to the aforementioned object, another aspect of the disclosure is to provide an AM method. In the AM method, an AM tool is used to fabricate workpiece products, wherein the workpiece products are divided into first workpiece products and a second workpiece product, and the second workpiece product is fabricated after the first workpiece products. An operation of fabricating each of the workpiece products includes placing powder layers layer by layer on a powder bed; and directing an energy beam to powder bodies on each of the powder layers sequentially after the each of the powder layers is placed on the powder bed to melt powder bodies to form melt pools. Then, qualities of the first workpiece products are measured respectively after the first workpiece products are completely fabricated, thereby obtaining actual metrology values of the first workpiece products. A temperature measurement is performed on each of the melt pools on the powder bed during a fabrication of each of the workpiece products, thereby obtaining a temperature of each of the melt pools of each of the workpiece products; photography is performed on each of the melt pools on the powder bed during the fabrication of each of the workpiece products, thereby obtaining an image of each of the melt pools of each of the workpiece products; and photography is performed on each of the powder layers after the each of the powder layers is placed on the powder bed and before the energy beam is applied to the each of the powder layers, thereby obtaining a workspace image of each powder layer of each workpiece product during the fabrication of the each workpiece product. Then, each of the workspace images is first converted to a gray level co-occurrence matrix (GLCM); and then a homogeneity index of each powder layer of each workpiece product is calculated based on the GLCM. Meanwhile, a length and a width of each of the melt pools are extracted from the image of each of the melt pools. Then, a melt-pool feature processing operation is performed to convert the length, the width and the temperature of each of the melt pools to a melt-pool length feature, a melt-pool width feature and a melt-pool temperature feature of each of the workpiece products. Then, a conjecture model is built by using plural sets of first process data and the actual metrology values of the first workpiece products in accordance with a prediction algorithm, in which the sets of first process data include the melt-pool length feature, the melt-pool width feature and the melt-pool temperature feature of each of the first workpiece products. Thereafter, a virtual metrology value of the second workpiece product is predicted by using the conjecture model based on a set of second process data, in which the set of second process data includes the melt-pool length feature, the melt-pool width feature and the melt-pool temperature feature of the second workpiece product.

In some embodiments, the AM further includes performing a simulation operation based on the sets of process data and/or the actual metrology values of the workpiece products, thereby generating a set of suggested parameter ranges; generating a set of process-parameter adjusted values based on the virtual metrology value; generating a set of process-parameter tracking values based on the set of process-parameter adjusted values, the set of suggested parameter ranges and a set of parameter design values; and controlling and adjusting the AM tool to process the second workpiece product in accordance with the set of process-parameter tracking values.

Thus, with the applications of the embodiments of the disclosure, the quality of an end product or a product that is being processed layer by layer can be obtained in time, and thus process parameters of an AM tool can be adjusted on a production line, thereby increasing yield.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
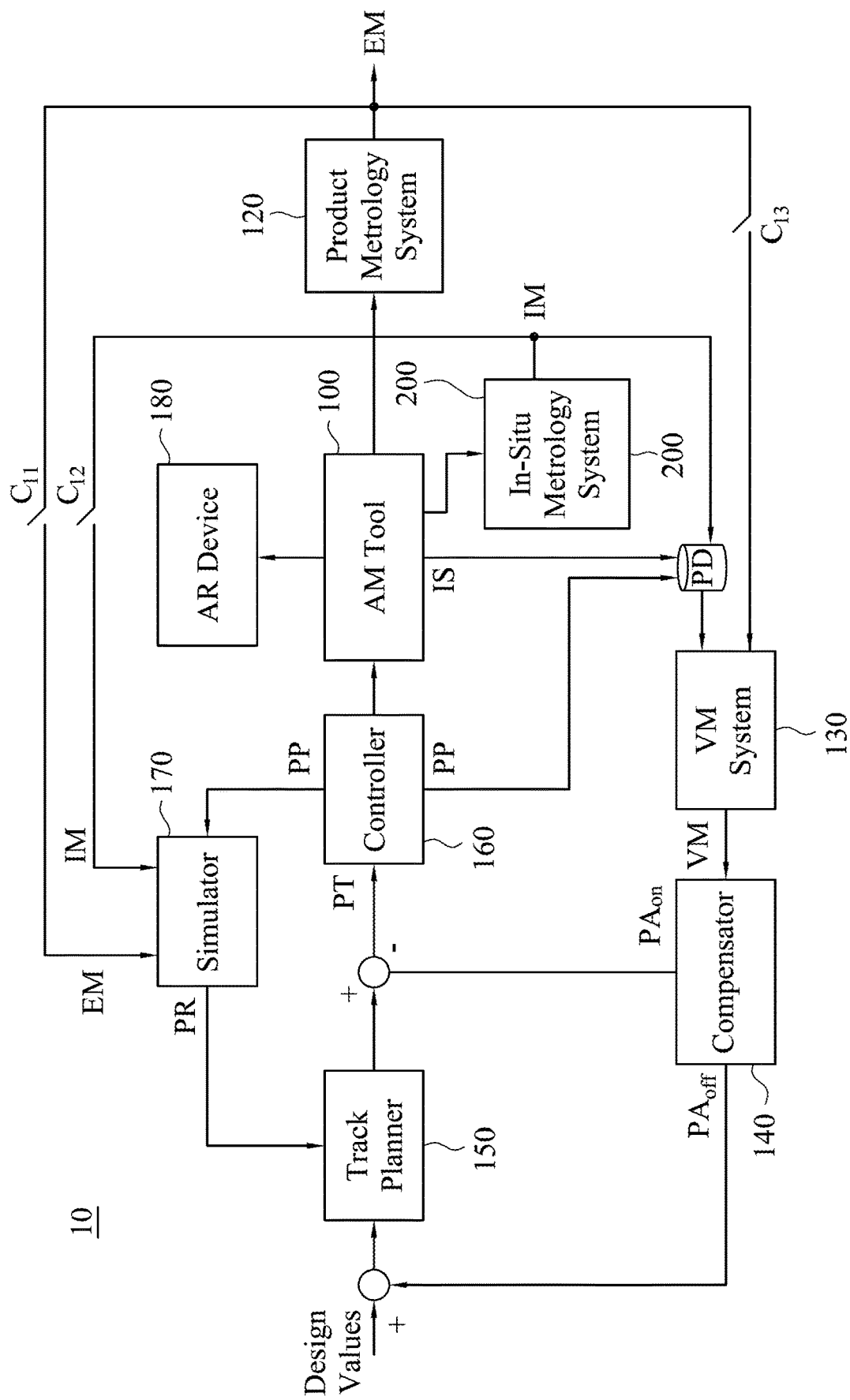
FIG. 1A is a schematic diagram showing an additive manufacturing (AM) system in accordance with some embodiments of the disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1A, FIG. 1A is a schematic diagram showing an additive manufacturing (AM) system 10 in accordance with some embodiments of the disclosure, in which switches C11, C12 and C13 are used for selecting if data are inputted to a corresponding system or device. The AM system 10 includes an AM tool 100, a product metrology system 120, an in-situ metrology system 200, a VM system 130, a compensator 140, a track planner 150, a controller 160, a simulator 170 and an augmented reality (AR) device 180.

Figure 1B:
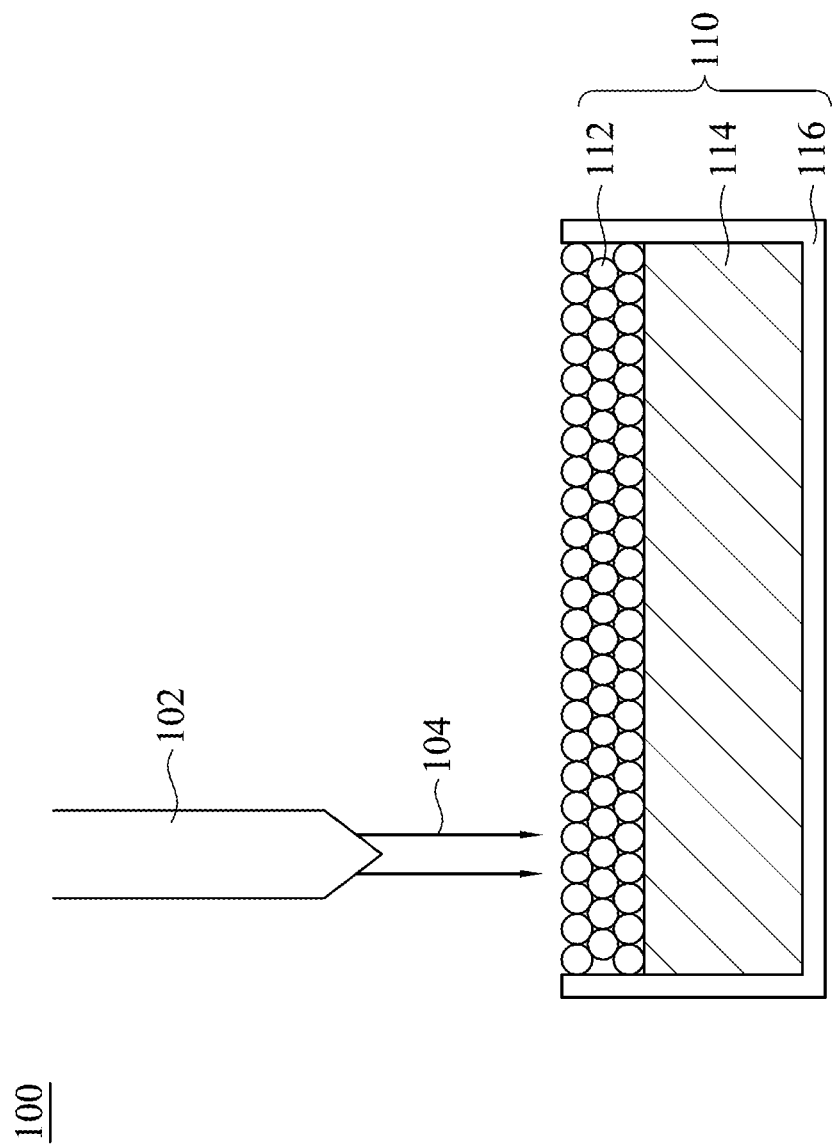
FIG. 1B is a schematic diagram showing an additive manufacturing (AM) tool on a process stage in accordance with some embodiments of the disclosure.

Referring to FIG. 1B, FIG. 1B is a schematic diagram showing the AM tool 100 on a process stage in accordance with some embodiments of the disclosure. The AM tool 100 includes a powder bed 110 and a fusion system 102 (such as a laser source). The power bed 110 includes a powder bed container 116 in which a substrate 114 and powder layers 112 alternatively stacked on the substrate 114 are held, in which the powder bed 112 includes plural powder bodies. The AM tool 100 uses a powder bed fusion process to fabricate workpiece products. During the fabrication process of each of the workpiece products, the fusion system 102 is used to provide an energy beam 104 to the respective powder bodies of the powder bed 110, and the powder layers 112 are melted to form and obtain a desired profile of the workpiece product by controlling specific parameters. When the respective powder bodies are melted. Plural melt pools are formed on the powder bed 110. In some embodiments, the powder bed fusion process is a selective laser melting (SLM) process, or a selective laser sintering (SLS) process.

As shown in FIG. 1A, an object of the simulator 170 is to find feasible process parameter ranges, and the AR device 180 is configured to assist the operation and maintenance of the AM tool 100. The product metrology system 120, the in-situ metrology system 200, the VM system 130 are integrated to estimate variation of each material layer on the powder bed 110 of the AM tool 100. The compensator 140 can compensate process variation online (on the production line) or offline (off the production line) by adjusting process parameters. The product metrology system 120 is configured to measure qualities of the workpiece products respectively after the workpiece products are completely fabricated, thereby obtaining plural actual metrology values EM (such as an actual metrology value of surface roughness or porosity, etc.). The in-situ metrology system 200 is configured to collect a set of feature data IM of each melt pool on the powder bed 110 and a homogeneity index of each powder layer during a fabrication process of each workpiece product, and the set of feature data IM (melt pool characteristics) includes a melt-pool length feature, a melt-pool width feature and a melt-pool temperature feature.

The VM system 130 is configured to use sets of process data PD and actual metrology values EM of the workpiece products to predict a virtual metrology value VM (such as a virtual metrology value of surface roughness or porosity, etc.) of a next workpiece product processed by the AM tool 100 in accordance with a prediction algorithm after the workpiece products have been fabricated by the AM tool 100, each of the sets of process data PD including the melt-pool length feature, the melt-pool width feature and the melt-pool temperature feature of each of the workpiece products. In addition, the sets of process data PD also may include process parameter data PP (such as laser power values, etc.) provided by the controller 160 and sensing data IS (such as flow speed, oxygen density, etc.) provided by the AM tool 100.

In some embodiments, the prediction algorithm used by the VM system 130 may be a neural network algorithm or a multiple regression algorithm. However, another algorithm is also applicable to the disclosure, such as a back propagation neural network (BPNN) algorithm, a general regression neural network (GRNN) algorithm, a radial basis function neural network (RBFNN) algorithm, a simple recurrent network (SRN) algorithm, a support vector data description (SVDD) algorithm, a support vector machine (SVM) algorithm, a multiple regression (MR) algorithm, a partial least squares (PLS) algorithm, a nonlinear iterative partial least Squares (NIPALS) algorithm, or a generalized linear models (GLMs), etc. Thus, the disclosure is not limited thereto.

The simulator 170 is configured to perform a simulation operation based on the sets of process data PD and/or the actual metrology values EM of the workpiece products, thereby generating a set of suggested parameter ranges PR. The compensator 140 is configured to generate a set of process-parameter adjusted values based on the virtual metrology value VM of the next workpiece product, in which the process-parameter adjusted values may be divided into on-line (on the production line) process-parameter adjusted values $PA_{on}$ and off-line process-parameter adjusted values $PA_{off}$. The track planner 150 is configured to generate a set of process-parameter tracking values PT based on the set of off-line process-parameter adjusted values $PA_{off}$, the set of suggested parameter ranges PR and a set of parameter design values. The controller 160 is configured to control and adjust the AM tool 100 to process the next workpiece product in accordance with the set of process-parameter tracking values PT. The simulator 170 used in the embodiments of the disclosure may be based on U.S. Patent Publication No. 20190128738, which is hereby incorporated by reference.

Figure 2A:
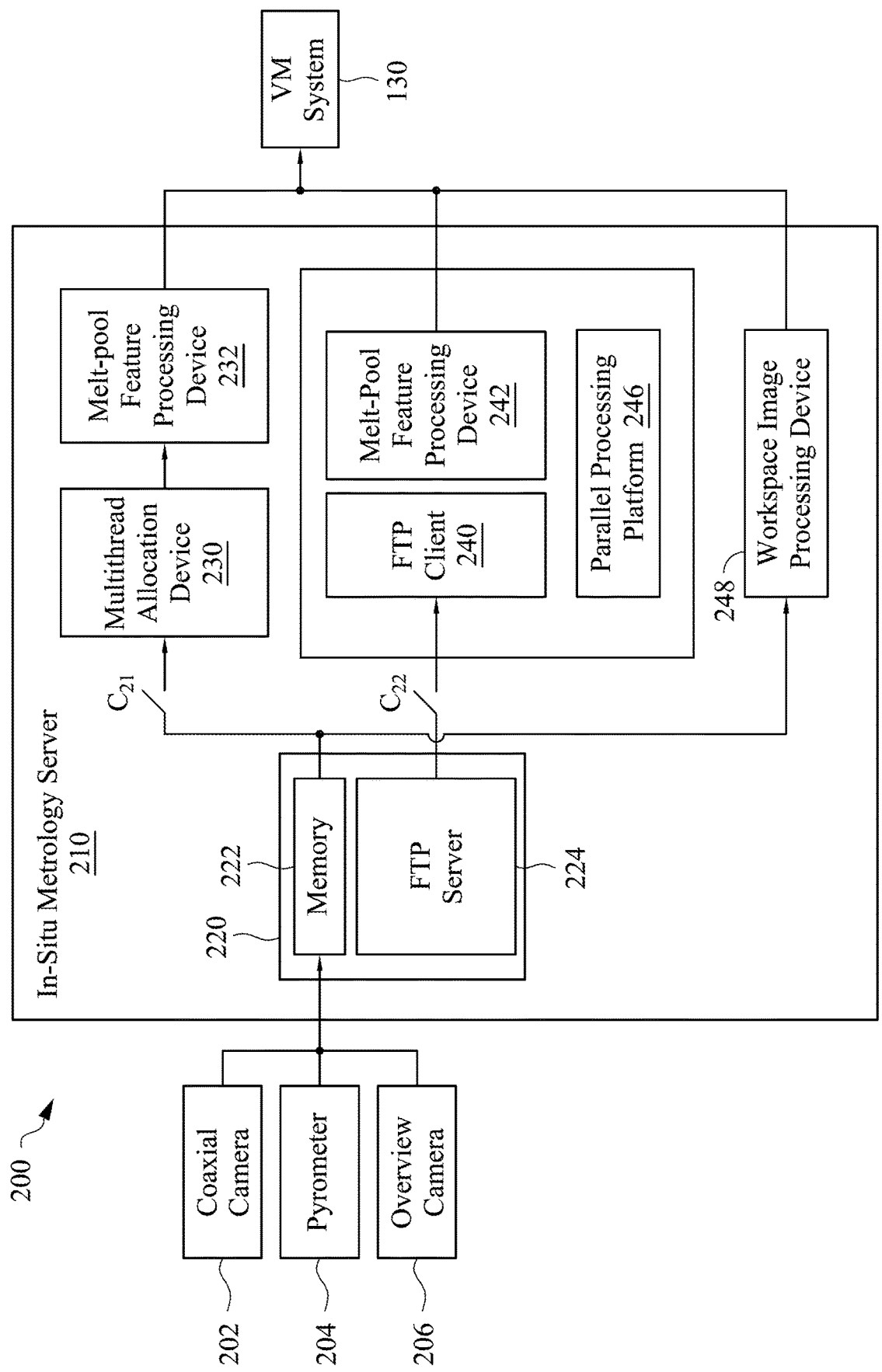
FIG. 2A is a schematic block diagram of an in-situ metrology system in accordance with some embodiments of the disclosure.

Hereinafter, the in-situ metrology system 200 is explained. Referring to FIG. 2A, FIG. 2A is a schematic block diagram of the in-situ metrology system 200 in accordance with some embodiments of the disclosure. The in-situ metrology system 200 includes a coaxial camera 202, a pyrometer 204, an overview camera 206 and an in-situ metrology server 210. The pyrometer 204 is configured to perform a temperature measurement on each of the melt pools on the powder bed during a fabrication of each of the workpiece products, thereby obtaining a temperature of each of the melt pools of each of the workpiece products. In some embodiments, the pyrometer 204 is configured to perform a temperature measurement on each melt pool of each powder layer on the powder bed during a fabrication of each of the workpiece products. The coaxial camera 202 is configured to perform photography on each of the melt pools on the powder bed during the fabrication of each of the workpiece products, thereby obtaining an image of each of the melt pools of each of the workpiece products. The overview camera 206 is configured to perform photography on the powder bed layer by layer, thereby obtaining a workspace image of each layer of each workpiece product during the fabrication of the each workpiece product. The in-situ metrology server 210 includes an image-feature extraction device 220, a multithread allocation device 230, a FTP (File Transfer Protocol) client 240, melt-pool feature processing devices 232/242 and a workspace image processing device 248. The image-feature extraction device 220 is configured to extract a length and a width of each of the melt pools from the image of each of the melt pools, and extract a melt-pool temperature of each melt pool from the melt-pool temperatures measured by the pyrometer 204. The melt-pool feature processing devices 232/242 are configured to convert the length, the width and the temperature of each melt pool of each workpiece product to a melt-pool length feature, a melt-pool width feature and a melt-pool temperature feature of each workpiece product. The workspace image processing device 248 is configured to convert each of the workspace images to a gray level co-occurrence matrix GLCM); thereby obtaining a homogeneity index as the base for homogeneity evaluation. A method for obtaining the homogeneity index will be described later. After a melt-pool length feature, a melt-pool width feature and a melt-pool temperature feature of each workpiece product, and a homogeneity index of each layer of each workpiece product are obtained, the VM system uses plural sets of process data and the actual metrology values of the workpiece products to predict a virtual metrology value of a next workpiece product processed by the AM tool in accordance with a prediction algorithm after the workpiece products have been fabricated by the AM tool, the sets of process data including the melt-pool length feature, the melt-pool width feature and the melt-pool temperature feature of each of the workpiece products, and a homogeneity index of each layer of each workpiece product.

There are two computing loading modes in the in-situ metrology system 200, which are a light loading mode and a heavy loading mode. The light loading mode is applicable to workpieces with simple structures, such as the workpieces with no or few supporting pieces. The heavy loading mode is applicable to workpieces with complicated structures, such as the workpieces with a lot of supporting pieces, and the workpieces with diversified geometrical shapes.

The light loading mode and the heavy loading mode depend on the photographing frequency of the coaxial camera 202 and the sampling rate of the image-feature extraction device 220. A user may select a switch C21 or C22 to activate the light loading mode or the heavy loading mode in accordance with actual requirements. In the light loading mode, the features are extracted by conventional image preprocessing, and in contrast, the heavy loading mode uses a CNN (Conventional Neural Network)-based method in parallel computation. In the light loading mode, due to the high sampling rate, the in-situ metrology system 200 uses the multithread allocation device 230 to distribute a large amount of melt-pool images to different cores in a computer. In the heavy loading mode, the in-situ metrology system 200 is built on a parallel processing platform 246 (such as Hadoop). Hadoop is a distributed parallel processing platform for big data, which can start melt pool feature extraction (MPFE) per requests. A CNN-based MPFE can identify widths, lengths, and central locations of melt pools in different isothermal envelopes.

Figure 2B:
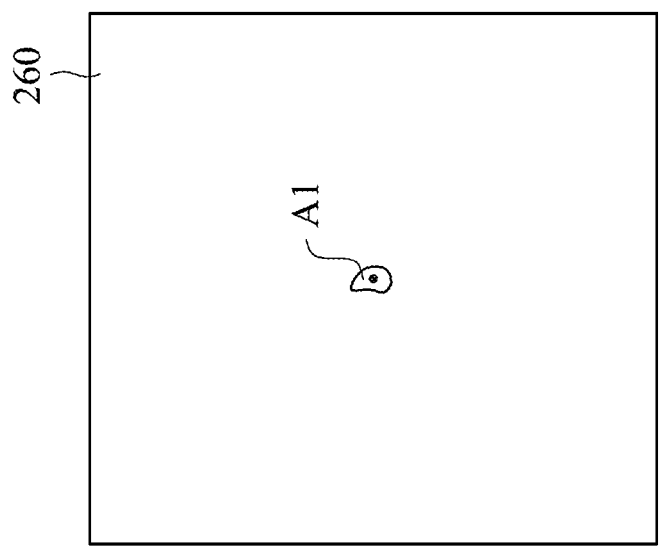
FIG. 2B is a schematic diagram showing additive manufacturing (AM) features in accordance with some embodiments of the disclosure.
Figure 2C:
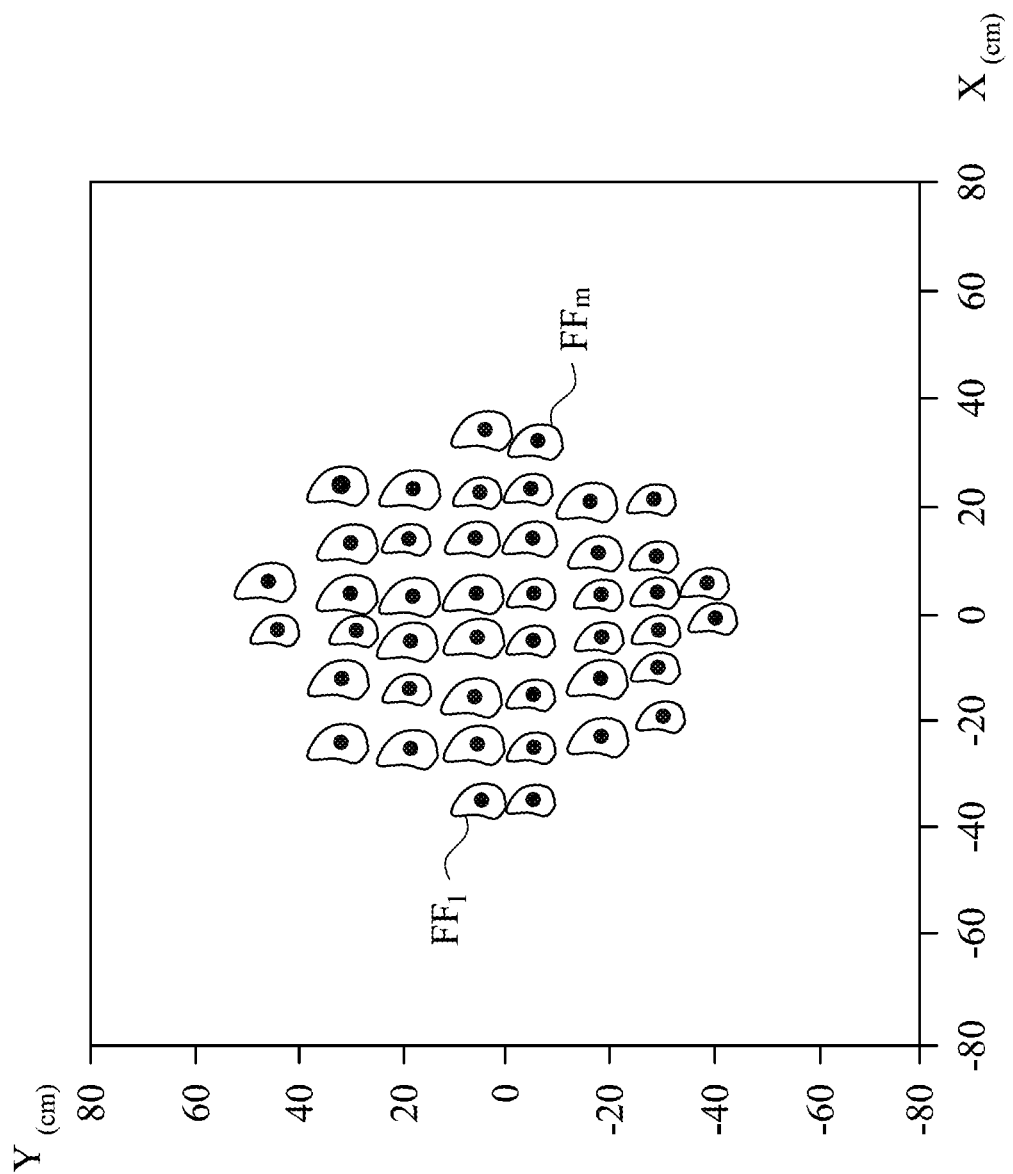
FIG. 2C is a schematic diagram showing extraction results of additive manufacturing (AM) features in accordance with some embodiments of the disclosure.

An additive manufacturing (AM) feature extraction method performed by the in-situ metrology system 200 according to some embodiments of the disclosure will be described in the below. Referring to FIG. 2B and FIG. 2C, FIG. 2A is a schematic block diagram of an in-situ metrology system in accordance with some embodiments of the disclosure; and FIG. 2B is a schematic diagram showing additive manufacturing (AM) features in accordance with some embodiments of the disclosure.

At first, during the powder bed fusion process of a workpiece product, the coaxial camera 202 is used at a predetermined frequency (for example, 4 kHz) to perform photograph on the powder bed, so as to obtain n melt-pool images (such as a melt-pool image 260 shown in FIG. 2B), the melt-pool images including an image of each melt pool (such as a melt pool A1 shown in FIG. 2B). Meanwhile, the pyrometer 204 is used at a predetermined frequency (for example, 100 kHz) to perform temperature measurements on the powder bed, thereby obtaining the temperature of each melt pool, and the overview camera 206 is used at a predetermined frequency (for example, 4 kHz) to perform photography on the powder bed layer by layer after each layer is placed on the powder bed and before an energy beam is applied to the layer, thereby obtaining plural workspace images. The workspace images can be used subsequently to find the locations at which abnormal quality occurs, and thus can be used as the base for quality evaluation, such as homogeneity evaluation.

Figure 3:
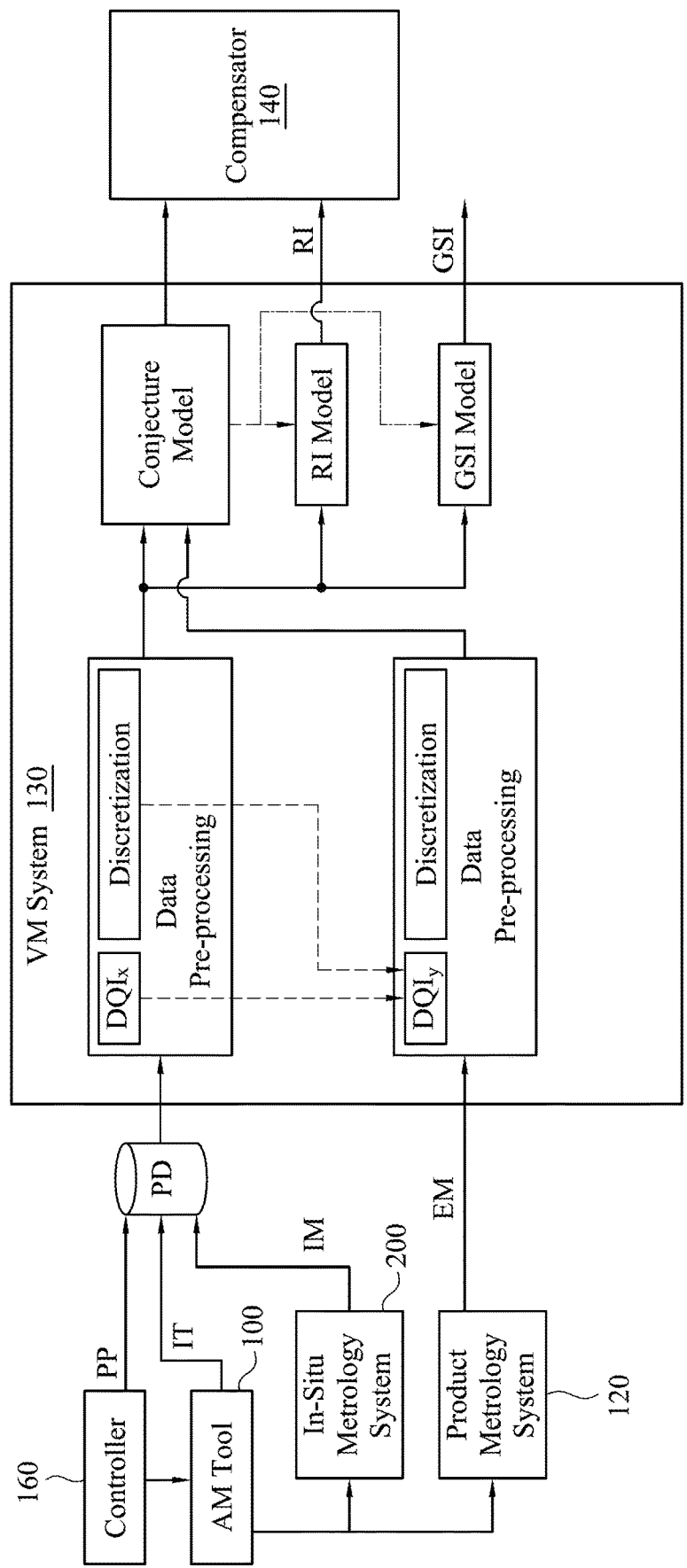
FIG. 3 a schematic block diagram of a virtual metrology (VM) system in accordance with some embodiments of the disclosure.

Thereafter, the image-feature extraction device 220 receives the image and temperature of each melt pool, and the images of work space images. The image-feature extraction device 220 stores these data into a memory 222, and provides instant download through the FTP server 224. Then, the melt-pool feature processing devices 232 or 242 processes the above data at a sample rate (for example 25 images/second), thereby selecting m sample images and their corresponding temperatures $T_i$ from the melt-pool images, where i=1 to m, m>0. Thereafter, the melt-pool feature processing devices 232 or 242 extracts a length Li, a width $W_i$, and a central location $(X_i, Y_i)$ of each melt pool from the m samples images, in which X and Y are values of coordinates (such as an image 262 shown in FIG. 2B), so as to obtain sample melt-pool data FFi=($W_i$, Li, $X_i$, $Y_i$, $T_i$), such as shown in FIG. 2C. Then, the melt-pool feature processing devices 232 or 242 performs a melt-pool feature processing operation to convert the sample melt-pool data FFi=($W_i$, Li, $X_i$, $Y_i$, $T_i$) to a melt-pool length feature, a melt-pool width feature and a melt-pool temperature feature of each melt pool of the workpiece product. In the melt-pool feature processing operation, at first, at least one predetermined area $S_j$ is defined at a periphery of the central location ($X_i$, $Y_i$), for example, an area extending ±3 pixels from the central location ($X_i$, $Y_i$). In some embodiments, the predetermined area $S_j$ is an area containing all of the sample melt-pool data FFi=($W_i$, Li, $X_i$, $Y_i$, $T_i$). Then, the melt-pool length feature $L_j$, the melt-pool width feature $W_j$, and the melt-pool temperature feature $T_j$ in the predetermined area $S_j$ is calculated. The melt-pool length feature $L_j$ includes a maximum value, a minimum value, a mean value, a variance, a standard deviation, a skewness of statistic distribution, a kurtosis of statistic distribution, a full distance and/or a set of quantile of lengths of the melt pools in the predetermined area $S_j$. The melt-pool width feature $W_j$ includes a maximum value, a minimum value, a mean value, a variance, a standard deviation, a skewness of statistic distribution, a kurtosis of statistic distribution, a full distance and/or a set of quantile of widths of the melt pools in each of the ne predetermined area $S_j$. The melt-pool temperature feature $T_j$ includes a maximum value, a minimum value, a mean value, a variance, a standard deviation, a skewness of statistic distribution, a kurtosis of statistic distribution, a full distance and/or a set of quantile of temperatures of the melt pools in each of the ne predetermined area $S_j$. It is understood that the computation methods of the maximum value, the minimum value, the mean value, the variance, the standard deviation, the skewness of statistic distribution, the kurtosis of statistic distribution, the full distance and the set of quantile of data points (such as lengths, widths or temperatures) are well known by those having ordinary knowledge in the art, and thus are not described herein. Meanwhile, the workspace image processing device 248 obtains and converts each of the workspace images to a gray level co-occurrence matrix (GLCM), thereby obtaining a homogeneity index. Hereinafter, the VM system 130 is described. Referring to FIG. 3, FIG. 3 a schematic block diagram of the VM system 130 in accordance with some embodiments of the disclosure. The VM system 130 used in embodiments of the disclosure can be referenced to U.S. Pat. No. 8,095,484 B2, and embodiments of the disclosure can be combined with a VM system based on U.S. Pat. No. 8,095,484 B2, which is hereby incorporated by reference.

The VM system 130 is divided into a model-building stage and a conjecturing stage. In the model-building stage, the VM system 130 builds a conjecture model by using plural sets of historical process data PD obtained when plural historical workpiece products are fabricated, and actual metrology values EM of the historical workpiece products measured after complete fabrication in accordance with a prediction algorithm. The VM system 130 also builds a process data quality index ($DQI_x$) model and a global similarity index (GSI) mode by using the sets of historical process data PD of the historical workpiece products, and computes a $DQI_x$ threshold and a GSI threshold. The VM system 130 also builds a metrology data quality index ($DQI_y$) model by using the actual metrology values EM of the historical workpiece products, and computes a $DQI_y$ threshold. The RI value is designed to gauge the reliance level of a virtual metrology value. The GSI value is used to assess the degree of similarity between the current set of input process data and all of the sets of process data used for building and training a conjecture model. The GSI value is provided to help the RI value gauge the reliance level of the VM system 130. The $DQI_x$ value is used to evaluate whether a set of process data used for producing a workpiece is abnormal, and the $DQI_y$ value is used to evaluate whether the metrology data of the workpiece are abnormal.

In the conjecturing stage, the VM system 130 predicts a virtual metrology value VM of a workpiece product to be measured by using the conjecture model based on a set of process data PD that is obtained when the workpiece product to be measured is fabricated by the AM tool 100. The sets of process data and historical process data PD include the melt-pool length feature, the melt-pool width feature and the melt-pool temperature feature of each of the historical workpiece product and the workpiece product to be measured, and the homogeneity index of each layer of each of the historical workpiece product and the workpiece product to be measured. Besides, the process data and historical process data PD may also include process parameter data PP (such as laser power values, etc.) provided by the controller 160 and sensing data IS (such as flow speed, oxygen density, etc.) provided by the AM tool 100. It is noted that the VM system 130 may conjecture a VM value of an end-product workpiece or VM values of respective material layers of one product workpiece.

Figure 4:
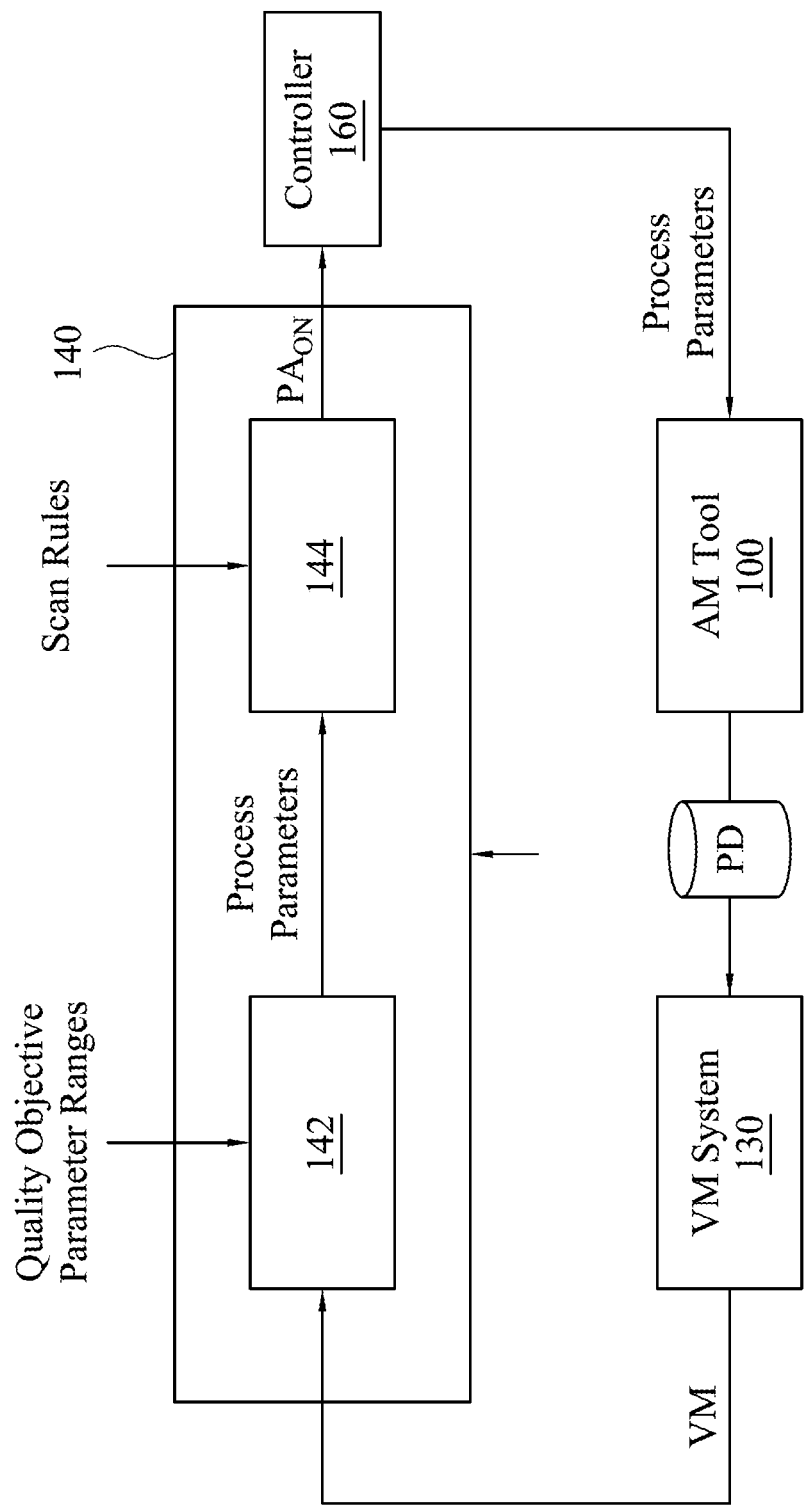
FIG. 4 a schematic block diagram of a compensator in accordance with some embodiments of the disclosure.

The compensator 140 will be described in the below. Referring to FIG. 4, FIG. 4 a schematic block diagram of the compensator 140 in accordance with some embodiments of the disclosure. The process parameters (such as laser power, scan speed, etc.) of the AM machine 100 can be adjusted by the compensator 140 with virtual metrology values VM based on an evolution optimization method. The compensator 140 includes a parameter optimization device 142 and a fuzzy controller 144. The parameter optimization device 142 selects optimal parameters with, for example, a Hybrid Taguchi-Genetic Algorithm (HTGA) and quality objective parameter ranges. The fuzzy controller 144 suggests the on-line process-parameter adjusted values $PA_{on}$ through scan rules. Then, the controller 160 modifies its parameters by layers according to the on-line process-parameter adjusted values $PA_{on}$.

Figure 5A:
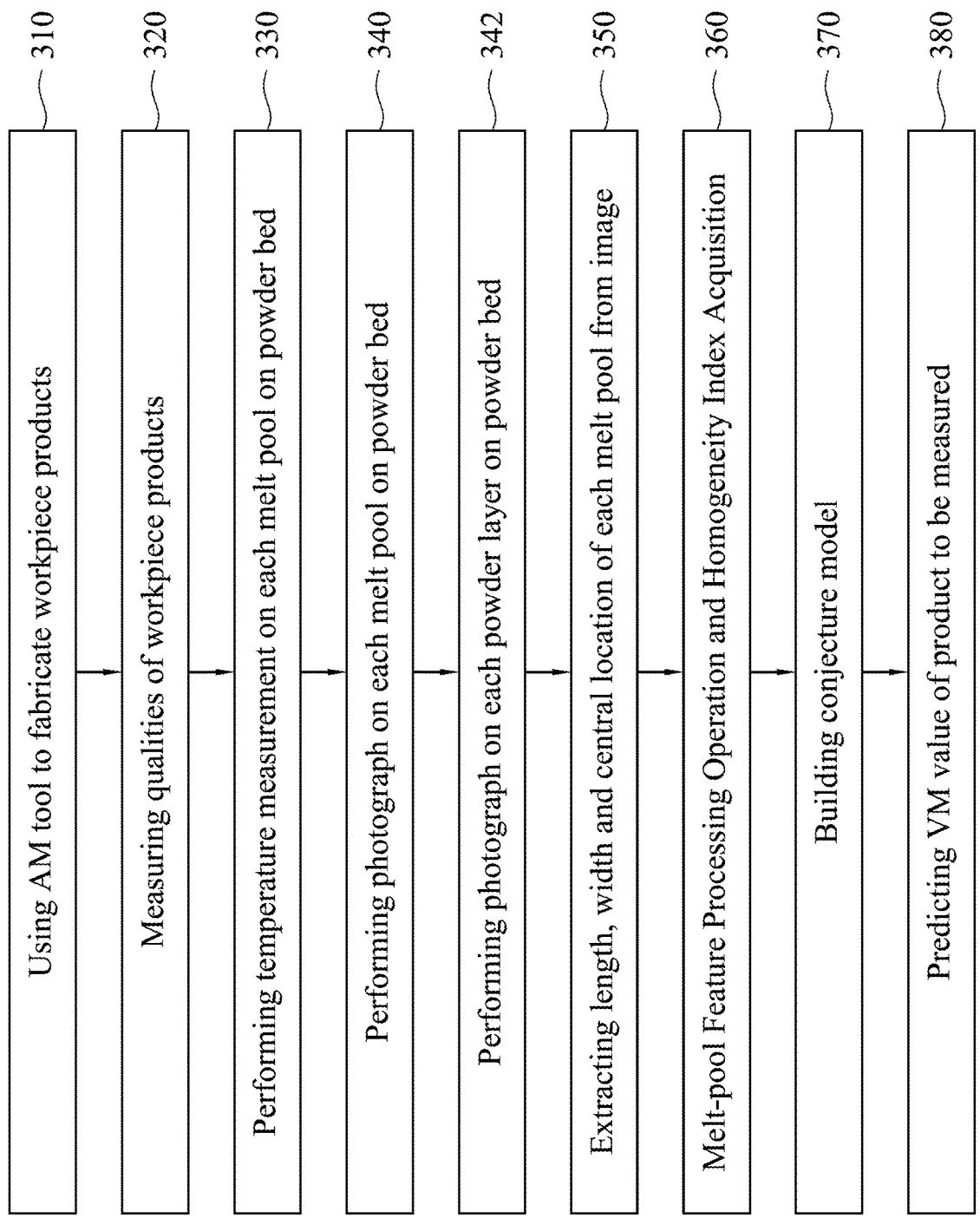
FIG. 5A illustrates a schematic flow chart showing an additive manufacturing (AM) method in accordance with some embodiments of the disclosure.

Hereinafter, an additive manufacturing (AM) method is explained. Referring to FIG. 5A, FIG. 5A illustrates a schematic flow chart showing an AM method in accordance with some embodiments of the disclosure. As shown in FIG. 5, step 310 is first performed to use an AM tool to fabricate workpiece products, in which the workpiece products includes first workpiece products (i.e. the historical workpiece products for molding building) and a second workpiece product (the workpiece product to be measured), and the second workpiece product is fabricated after the first workpiece products. An operation of fabricating each of the workpiece products includes placing powder layers layer by layer on a powder bed; and after each of the powder layers is placed on the powder bed, directing an energy beam to powder bodies on the each of the powder layers sequentially to melt powder bodies to form melt pools. Qualities of the first workpiece products are measured respectively after the first workpiece products are completely fabricated (step 320), thereby obtaining actual metrology values of the first workpiece products. A temperature measurement is performed on each of the melt pools on the powder bed during a fabrication of each of the workpiece products, thereby obtaining a temperature of each of the melt pools of each of the workpiece products (step 330). Photograph is performed on each of the melt pools on the powder bed during the fabrication of each of the workpiece products (step 340), thereby obtaining an image of each of the melt pools of each of the workpiece products. Photograph is performed on each of the powder layers on the powder bed during the fabrication of each of the workpiece products (step 342), thereby obtaining a workspace image of each of the powder layers of each of the workpiece products. A length, a width and a central location of each of the melt pools is extracted from the image of each of the melt pools (step 350). Thereafter, a melt-pool feature processing operation and homogeneity index acquisition (step 360) are performed to convert the length, the width and the temperature of each of the melt pools to a melt-pool length feature, a melt-pool width feature and a melt-pool temperature feature of each of the workpiece products, and to convert a workspace image of each powder layer of each workpiece product to a homogeneity index. Thereafter, a conjecture model is built by using plural sets of first process data and the actual metrology values of the first workpiece products in accordance with a prediction algorithm (step 370), in which the sets of first process data include the homogeneity index of each powder layer of each of the workpiece products, the melt-pool length feature, the melt-pool width feature and the melt-pool temperature feature of each of the first workpiece products. Then, a virtual metrology value of the second workpiece product (the product to be measured) is predicted by using the conjecture model based on a set of second process data (step 380), in which the set of second process data includes the melt-pool length feature, the melt-pool width feature and the melt-pool temperature feature of the second workpiece product.

Figure 5B:
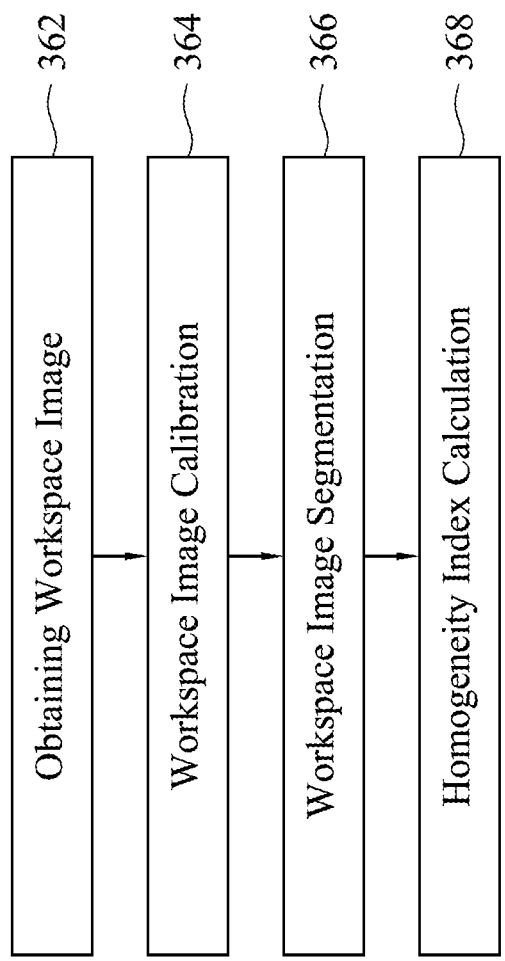
FIG. 5B illustrates a schematic flow chart showing a homogeneity index acquisition method for each workspace image in accordance with some embodiments of the disclosure.

Hereinafter, a method for converting a workspace image of each powder layer to a homogeneity index is explained. Referring to FIG. 5B, FIG. 5B illustrates a schematic flow chart showing a homogeneity index acquisition method for each workspace image in accordance with some embodiments of the disclosure. In the homogeneity index acquisition method, a workspace image of a powder layer is obtained (step 362) after a laser process has been performed on the powder layer. Then, workspace image calibration step 364 is performed to calibrate the position and the view angle of the workspace image, and to define a range of workspace on the workspace image. Thereafter, a workspace image segmentation step 366 is performed to divide the workspace image into n by n pixel regions (for example 5×5), such as a greylevel intensity image 410 shown in FIG. 5C. Thereafter, a homogeneity index calculation step 368 is performed to obtain a homogeneity index from the greylevel intensity image 410.

Figure 5C:
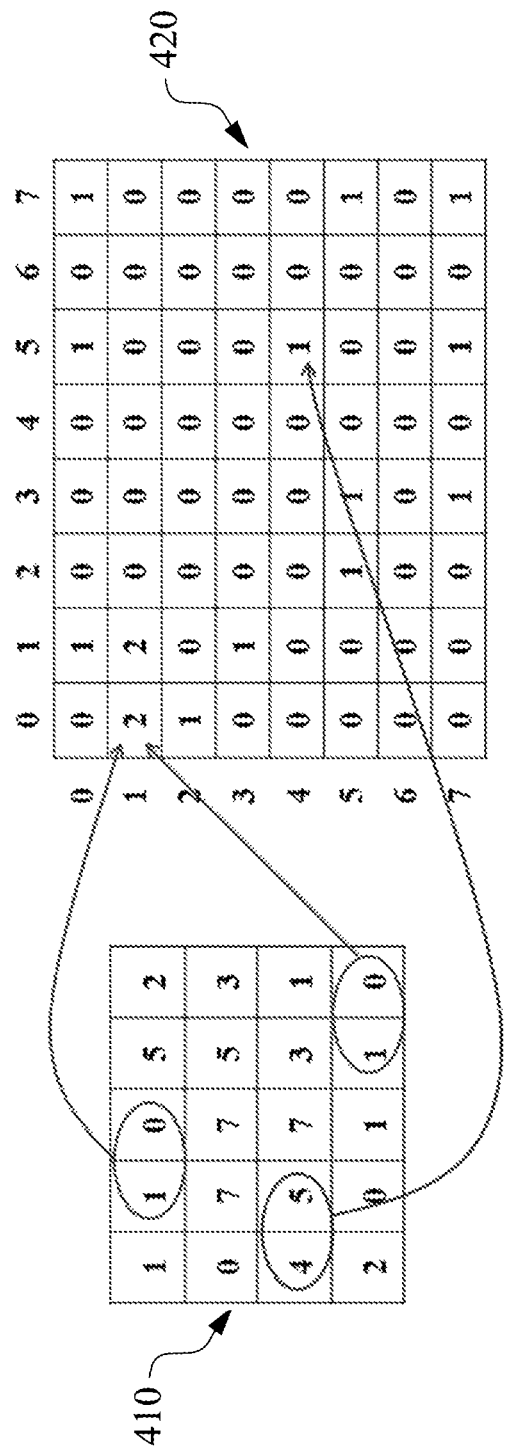
FIG. 5C is a schematic diagram showing converting a workspace image to a gray level co-occurrence matrix (GLCM)

In the homogeneity index calculation step 368, the greylevel intensity image 410 is first converted to a gray level co-occurrence matrix (GLCM); 420. As shown in FIG. 5C, For the greylevel intensity image 410 in which each pixel region has a respective intensity, the GLCM 420 for the greylevel intensity image 410 indicates how often a pixel region of a certain intensity occurs next to a pixel region of another certain intensity. In the example shown in FIG. 5C, the GLCM 420 derived from the greylevel intensity image 410 records how many times a pixel region of a first intensity (the intensity varying from 0 to 7) occurs immediately to the right of a pixel region of a second intensity, where the first intensity is shown on the horizontal axis (columns) and the second intensity is shown on the vertical axis of the GLCM 420 (rows). As shown in the greylevel intensity image 410, there are one occurrence of a pixel region of intensity 5 occurring immediately to the right of a pixel region of intensity 4, such as "1" shown in the $5^{th}$ column of the $4^{th}$ row of the GLCM 620. In the greylevel intensity image 410, there are two occurrences of a pixel region of intensity 0 occurring immediately to the right of a pixel of intensity 1, such as "2" shown in the $0^{th}$ column of the $1^{st}$ row of the GLCM 620. However, there are no occurrences in greylevel intensity image 410 of a pixel region of intensity 2 occurring immediately to the right of a pixel region of intensity 1, as shown in the $1^{th}$ column of the $2^{nd}$ row of the GLCM 620. Then, a homogeneity index of the image 610 is calculated based on the GLCM 620 according to the following equation.

$$\text{Homogeneity Index} = \sum_i \sum_j \frac{P_{ij}}{[1 + (i-j)^2]} \quad (1)$$

where i, j are intensities, which are integers from 0 to 7; and $P_{i,j}$ are values in the GLCM.

Figure 5D:
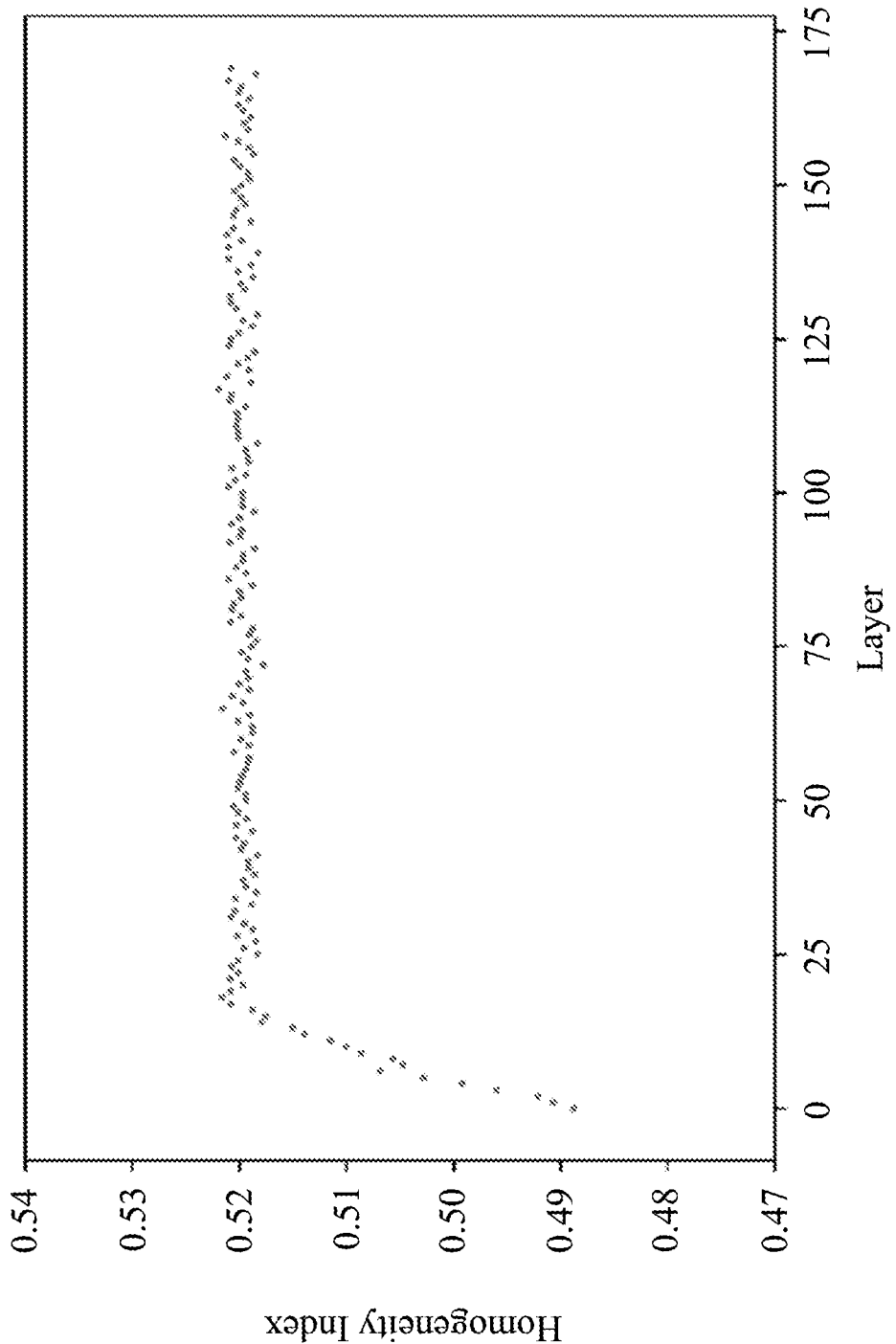
FIG. 5D show homogeneity indexes of powder layers in accordance with an example of the disclosure.

For additive manufacturing, the powder layers must be deposited with constant thickness and homogeneity. The homogeneity index represents the degree of homogeneity of one powder layer. The homogeneity index may be used to determine if the powder layer is uniform. Referring to FIG. 5D, FIG. 5D shows homogeneity indexes of powder layers in accordance with an example of the disclosure. As shown in FIG. 5D, the homogeneity indexes of the first 18 powder layers are small, and thus the first 18 powder layers are relatively not uniform. The homogeneity indexes of powder layers above the $18^{th}$ powder layer are large, and thus those powder layers are quite uniform. It is noted that embodiment of the disclosure use homogeneity indexes of powder layers to predict a virtual metrology value of a workpiece product.

It is understood that the aforementioned steps described in the embodiments of the disclosure can be combined or skipped, and the order thereof can adjusted according actual requirements. The aforementioned embodiments can be realized as a computer program product, which may include a machine-readable medium on which instructions are stored for programming a computer (or other electronic devices) to perform a process based on the embodiments of the present invention. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present invention also can be downloaded as a computer program product, which may be transferred from a remote computer to a requesting computer by using data signals via a communication link (such as a network connection or the like).

It can be known from the aforementioned embodiments that, by using the AM system provided by the embodiments of the disclosure, the AM tool can be effectively controlled in time. By using the AM feature extraction method provided by the embodiments of the disclosure, AM features can be effectively extracted form an enormous amount of data, thereby successfully performing virtual metrology on additive manufactured products, thus obtaining the quality of an end product or an product that are being processed layer by layer in time, such that process parameters of an AM tool can be adjusted on a production line for increasing yield.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims.

What is claimed is:

1. An additive manufacturing (AM) system, comprising:
   an AM tool configured to fabricate a plurality of workpiece products, wherein the AM tool comprises:
      a powder bed, comprising a powder bed container in which a plurality of powder layers that are stacked on each other are held; and
      a fusion system configured to direct an energy beam to a plurality of powder bodies on each of the powder layers respectively after the each of the powder layers is placed on the powder bed during a process of fabricating each of the workpiece products, thereby melting the powder bodies to form a plurality of melt pools;
   a product metrology system configured to measure qualities of the workpiece products respectively after the workpiece products are completely fabricated, thereby obtaining a plurality of actual metrology values;
   an in-situ metrology system, comprising:
      a pyrometer configured to perform a temperature measurement on each of the melt pools on the powder bed during a fabrication of each of the workpiece products, thereby obtaining a temperature of each of the melt pools of each of the workpiece products;
      a coaxial camera configured to perform photography on each of the melt pools on the powder bed during the fabrication of each of the workpiece products, thereby obtaining an image of each of the melt pools of each of the workpiece products;
      an overview camera configured to perform photography on each of the powder layers after the each of the powder layers is placed on the powder bed and before the energy beam is applied to the each of the powder layers, thereby obtaining a plurality of workspace images of the powder layers of each workpiece product during the fabrication of the each workpiece product; and
      an in-situ metrology server, comprising:
         a workspace image processing device configured to first convert each of the workspace images to a gray level co-occurrence matrix (GLCM); and then calculate a homogeneity index of each powder layer of each workpiece product based on the GLCM;
         an image-feature extraction device configured to extract a length and a width of each of the melt pools from the image of each of the melt pools, and to correspond the length and the width to the temperature; and
         a melt-pool feature processing device configured to convert the length, the width and the temperature of each of the melt pools to a melt-pool length feature, a melt-pool width feature and a melt-pool temperature feature of each of the workpiece products; and
   a virtual metrology system configured to use a plurality of sets of process data and the actual metrology values of the workpiece products to predict a virtual metrology value of a next workpiece product processed by the AM tool in accordance with a prediction algorithm after the workpiece products have been fabricated by the AM tool, the sets of process data comprising the homogeneity index of each powder layer of each of the workpiece products, the melt-pool length feature, the melt-pool width feature and the melt-pool temperature feature of each of the workpiece products.

2. The additive manufacturing (AM) system of claim 1, further comprising:
   a simulator configured to perform a simulation operation based on the sets of process data and/or the actual metrology values of the workpiece products, thereby generating a set of suggested parameter ranges;
   a compensator configured to generate a set of process-parameter adjusted values based on the virtual metrology value;
   a track planner configured to generate a set of process-parameter tracking values based on the set of process-parameter adjusted values, the set of suggested parameter ranges and a set of parameter design values; and
   a controller configured to control and adjust the AM tool to process the next workpiece product in accordance with the set of process-parameter tracking values.

3. The additive manufacturing (AM) system of claim 1, wherein the melt-pool length feature, the melt-pool width feature and the melt-pool temperature feature comprise a maximum value, a minimum value, a mean value, a variance, a standard deviation, a skewness of statistic distribution, a kurtosis of statistic distribution, a full distance and/or a set of quantile of lengths of the melt pools in each of the at least one predetermined area; a maximum value, a minimum value, a mean value, a variance, a standard deviation, a skewness of statistic distribution, a kurtosis of statistic distribution, a full distance and/or a set of quantile of widths of the melt pools in each of the at least one predetermined area; and a maximum value, a minimum value, a mean value, a variance, a standard deviation, a skewness of statistic distribution, a kurtosis of statistic distribution, a full distance and/or a set of quantiles of temperatures of the melt pools in each of the at least one predetermined area.

* * * * *